United States Patent [19]

Satran et al.

[11] Patent Number: 5,382,118
[45] Date of Patent: Jan. 17, 1995

[54] MILLING CUTTER INSERT

[75] Inventors: Amir Satran, Kfar Havradim; Yiri Man, Haifa, both of Israel

[73] Assignee: Iscar Ltd., Migdel Tefen, Israel

[21] Appl. No.: 114,417

[22] Filed: Aug. 30, 1993

[30] Foreign Application Priority Data

Sep. 9, 1992 [IL] Israel ........................................ 103115

[51] Int. Cl.6 ............................................. B23C 5/10
[52] U.S. Cl. ..................................... 407/42; 407/113; 407/48; 407/53
[58] Field of Search ....................... 407/34, 40, 41, 42, 407/48, 53, 113, 114, 115, 116

[56] References Cited

U.S. PATENT DOCUMENTS

| | | |
|---|---|---|
| 5,071,292 | 12/1991 | Satran . |
| 5,078,550 | 1/1992 | Satran et al. . |
| 5,158,402 | 10/1992 | Satran et al. ........................ 407/34 |
| 5,203,649 | 4/1993 | Katbi et al. ......................... 407/114 |
| 5,232,319 | 8/1993 | Satran et al. ........................ 407/48 |

FOREIGN PATENT DOCUMENTS 0156780 3/1985 European Pat. Off. .
0489702A2 12/1991 European Pat. Off. .

*Primary Examiner*—Jack W. Lavinder
*Attorney, Agent, or Firm*—Pennie & Edmonds

[57] ABSTRACT

A substantially square-shaped exchangeable milling insert for mounting in a cylindrical milling cutter tool for millint 90° recesses in a workpiece and having four indexable cutting edges from respective side edges of said base and intersecting said rake surface, each cutting edge comprising first, second and third successive angularly disposed portions being such that during cutting, the first and second portions of a cutting edge cut an upright surface of a substantially 90° recess in a workpiece with a third portion of an adjacent cutting edge serving as a wiper for a base surface of the recess, at least the first and second portions of each cutting edge being so located that all points thereon lie on a cylindrical envelope generated by a line parallel to a rotary axis of the cutting tool and rotating with respect to the rotary axis at a radius equal to the cutting radius of the cutting tool.

8 Claims, 4 Drawing Sheets

MILLING CUTTER INSERT

FIELD OF THE INVENTION

This invention relates to an exchangeable milling cutting insert for mounting in a cylindrical milling cutter tool and for use in cutting recesses such as, for example, shoulders, grooves or the like, having walls disposed at substantially 90° with respect to each other. Such recesses are hereinafter referred to as "recesses of the kind specified".

BACKGROUND OF THE INVENTION

Known milling cutter tools of this kind generally fall into two categories. In the first of these categories, the tool is provided with a single, peripherally disposed row of inserts, each insert being formed with a main cutting edge directed substantially parallel to the rotary axis of the cutting tool and designed to mill an upright wall of the recess or shoulder, and with a transversely directed wiper edge designed to wipe or smooth a base wall of the recess. Such tools are, of course, limited as far as the depth of the recess which can be milled, this depth not being greater than the extent of the main cutting edge. In a second category of tools, the milling cutter is provided, in addition, to a lowermost row of cutting inserts of the kind just described, with one or more additional peripheral rows of inserts which are each provided with main cutting edges directed substantially parallel to the rotary axis of the tool. With such a tool, the extent of milling of the milled upright wall of the recess is, of course, increased. It will be understood that whilst the inserts comprising the lowermost row must be provided with the transversely-directed wiper edges, the inserts comprising the second and any subsequent rows do not require the provision of such wiper edges.

Furthermore, it is clearly desirable, from an economic point of view, that each constituent insert be provided with a maximum number of cutting edges which can be readily indexed into position as and when required. Most known milling cutter inserts used for the purpose indicated are either oblong-rectangular, and are therefore provided with two cutting edges parallel to each other, or are triangular with three cutting edges.

It has been proposed in EP 0 156 780 to use in a cylindrical milling cutter for the milling of recesses of the kind specified, wherein each insert is of a basic square shape having four indexable cutting edges, each cutting edge being associated with a transversely-directed wiper edge located on an extension of the insert which projects beyond the basic square shape thereof. The use of such inserts is, however, clearly limited. They can only serve in cylindrical milling cutting tools having a single row of peripherally disposed inserts and therefore the depth of the recess formed is limited to the extent of the cutting edge of each insert.

In an alternative proposal in EP 0 489 702 A2, there is disclosed an essentially square-shaped insert for a milling cutter having four main cutting edges, each cutting edge having associated therewith what is referred to as a secondary edge But which is effectively a wiper edge and which is disposed at a slight angle with respect to the cutting edge. Whilst such a cutting insert is not subject to the limitation of the insert disclosed in EP 0 156 780, in that it does not have projecting extensions which inherently restrict the depth of the recess. This insert, however, which is specified as being mounted at a negative radial rake, is subject to the essential problem present with such inserts, namely that the relief angle presented by the cutting edge at its leading end is very much greater than the relief angle presented by the cutting edge at its opposite trailing end. On the assumption that the relatively smaller relief angle presented by the insert at its trailing end is, in fact, the minimum relief angle which should be employed, it will be realized that the relief angle at the leading end is unduly large, thereby leading to an increased danger of weakening of the cutting edge at this point, and a consequent lowering of tool life.

This problem, which is inherent with conventional milling cutting inserts, has been recognized and discussed in the applicants' prior U.S. Pat. Nos. 5,071,292 and 5,078,550 and alternative proposals are made respectively in these prior patent specifications so as to overcome these problems or disadvantages. These proposals were, however, all made within the context of oblong-rectangular cutting inserts and their application to inserts of basically square shape wherein four alternative cutting edges were provided, was in no way envisaged.

It is an object of the present invention to provide a new and improved exchangeable milling insert for mounting in a cylindrical cutter tool in which the above-referred-to disadvantages are substantially reduced or overcome.

BRIEF SUMMARY OF THE INVENTION

According to the present invention there is provided an exchangeable milling insert for mounting in a cylindrical milling cutter tool and comprising a substantially square, planar base, a substantially square upper rake surface, side flanks extending outwardly from respective side edges of said base and intersecting said rake surface at respective cutting edges of said insert, each cutting edge comprising first, second and third successive portions wherein said first and third portions extend respectively from adjacent corners of said insert so as to merge with said second portion; said second portion constituting the major portion of the overall length of said cutting edge; said first portion sloping away from said base towards said second portion; said second portion sloping towards said base away from said first portion and towards said third portion and said third portion sloping away from said base away from said second portion and towards an adjacent corner of said insert; each side flank comprising upper and lower angularly disposed side surfaces of which the upper constitutes a relief flank surface and the lower constitutes a locating portion; at least the relief angle of said relief flank surface in the region of a leading end substantially equals the relief angle in the region of the trailing end, all when measured with respect to the tool; the arrangement being such that during cutting, the first and second portions of a cutting edge cut an upright surface of a substantially 90° recess with a third portion of an adjacent cutting edge serving as a wiper i or a base surface of the recess, at least the first and second portions of each cutting edge being so located that all points thereon lie on a cylindrical envelope generated by a line parallel to a rotary axis of the cutting tool and rotating with respect to the rotary axis at a radius equal to the cutting radius of the cutting tool.

Preferably, the upper relief flank surface, at least in the region thereof adjacent said second edge portion, is curved; said upper rake surface, at least in the regimen thereof adjacent each second edge portion of said cutting edge, being cured such that when the insert is mounted in the cutter tool, the relief angle and the radial rake angle when measured with respect to the tool remain substantially constant along the length of said second portion.

Thus, the milling insert in accordance with the present invention, being of basic square shape, presents four alternative cutting edges for use in cutting the upright walls of the recess, each cutting edge being associated with a transversely directed wiper edge formed continuously with an adjacent cutting edge. By ensuring that the wiper edge is very slightly angularly disposed with respect to the second cutting edge portion of which it forms an extension, it is ensured that when that cutting edge portion is used in cutting the upright surface of the recess, the wiper edge which forms an extension of that cutting edge does not come into contact with the surface and is therefore not worn down.

On the other hand, by forming the insert so that each cutting edge has at least at its leading and trailing ends relief angles which, when measured with respect to the tool, are substantially equal, the disadvantages inherent in the prior art cutting inserts are substantially overcome.

Furthermore, by arranging for each main second cutting edge portion to be coupled to the corners of the insert by first and third portions as defined above (with the third portion forming an essential wiper edge), the provision of a square-shaped insert with the particularly designed relief and rake surfaces, is facilitated.

SUMMARY OF THE DRAWINGS

For a better understanding of the present invention, and to show how the same can be carried out in practice, reference will now be made to the accompanying, drawings, in which.

DETAILED DESCRIPTION OF PREFERRED EMBODIMENT

Figure 1:
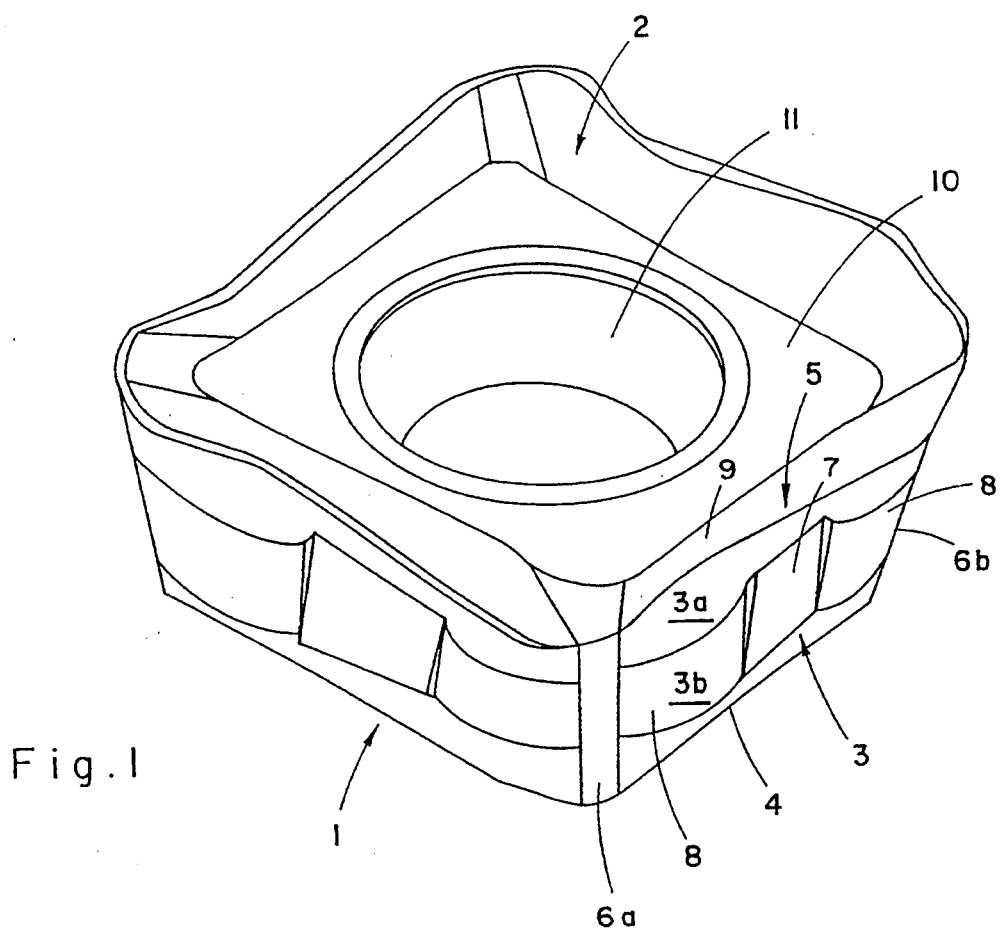
FIG. 1 is a schematic perspective view of a milling insert in accordance with the invention.
Figure 2:
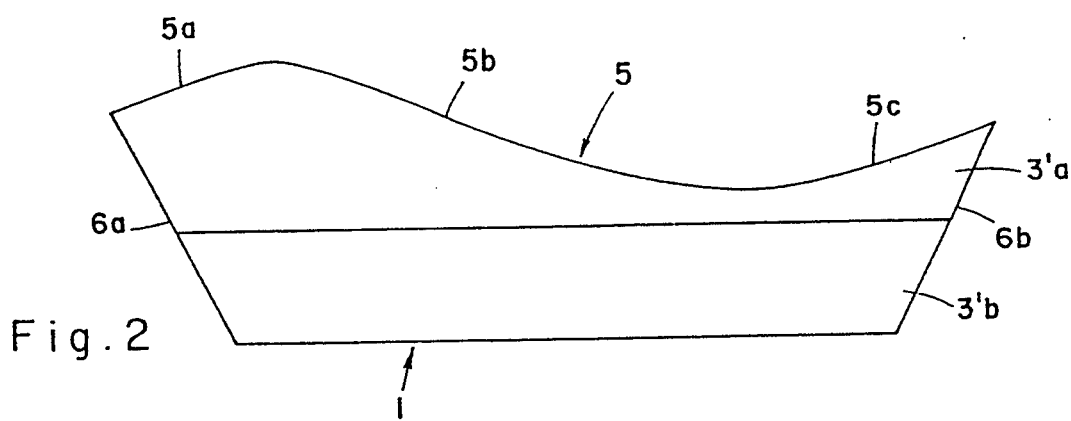
FIG. 2 is a schematic side elevation of the insert shown in FIG. 1.

As seen in FIGS. 1 and 2 to the drawings, the milling cutter insert comprises a substantially planar, square base 1 and a substantially square upper rake surface 2. For identical side flanks 3 (only two being seen) extend outwardly from respective side edges 4 of the base and intersect the rake surface 2 at respective cutting edges 5 of the insert. Each cutting edge 5 comprises, as clearly seen in FIG. 2 of the drawings, first, second and third cutting edge portions 5a, 5b, 5c. As seen in the drawings, these cutting edge portions are angularly directed with respect to each other, it being understood that, for the purposes of clarity of illustration, the relative angular inclinations of the cutting portions are shown extremely exaggerated as compared with those obtaining with the real insert. The first and third cutting edge portions 5a, 5c extend towards and merge with the second cutting edge portion 5b from respective rounded corners 6a, 6b of the insert. The first cutting edge portion 5a slopes upwardly and away from the base 1 of the insert, the second portion 5b slopes towards the base 1, whilst the third portion 5c slopes away from the base 1. As can be seen, the second component portion extends over the major portion of the length of the cutting edge 5 and constitutes preferably between 65 to 75% of the overall length. On the other hand, the third component portion can constitute anything between substantially 5 to 20% of the overall length of the cutting edge, whilst the first component portion extends for the remaining length of the cutting edge.

Each side flank 3 comprises upper and lower side portions 3a, 3b with the upper portion 3a constituting a relief flank surface and the lower portion 3b constituting an insert locating portion. In the embodiment shown in FIG. 1 of the drawings, the insert locating portion 3b is formed with a central recessed section 7 bounded on either side by a pair of outwardly curved sections 8.

The upper rake surface 2 is constituted adjacent each cutting edge 5 by a component rake surface 9 which extends downwardly from the cutting edge 5 in the direction of the base 1 towards a central, planar portion 10 of the upper rake surface 2 which is parallel with the base 1. Formed in the central, planar portion 10 and extending through the insert is a throughgoing bore 11, by means of which the insert can be clamped to the tool by means of a clamping screw extending through the bore 11.

In the embodiment shown in FIGS. 1 and 2 of the drawings, the upper relief flank 3a and the component rake surface 9 are curved such that, when the insert is mounted in the cutter tool, the relief angle and the radial rake angle, when measured with respect to the tool, remain substantially constant along the length of the cutting edge 5. This form of construction of a milling cutting insert, particularly when associated with a cutting edge which slopes downwardly with respect to a base of the insert, is fully described in our prior U.S. Pat. Nos. 5,071,292 and 5,078,550.

As will be described below with reference to FIG. 5 of the drawings, at least the first and second component cutting edges 5a, 5b are so orientated as to lie on a cylindrical envelope generated by a director rotating with respect to the axis of rotation of the milling cutter tool at a radius equal to the radius of the tool.

Figure 4:
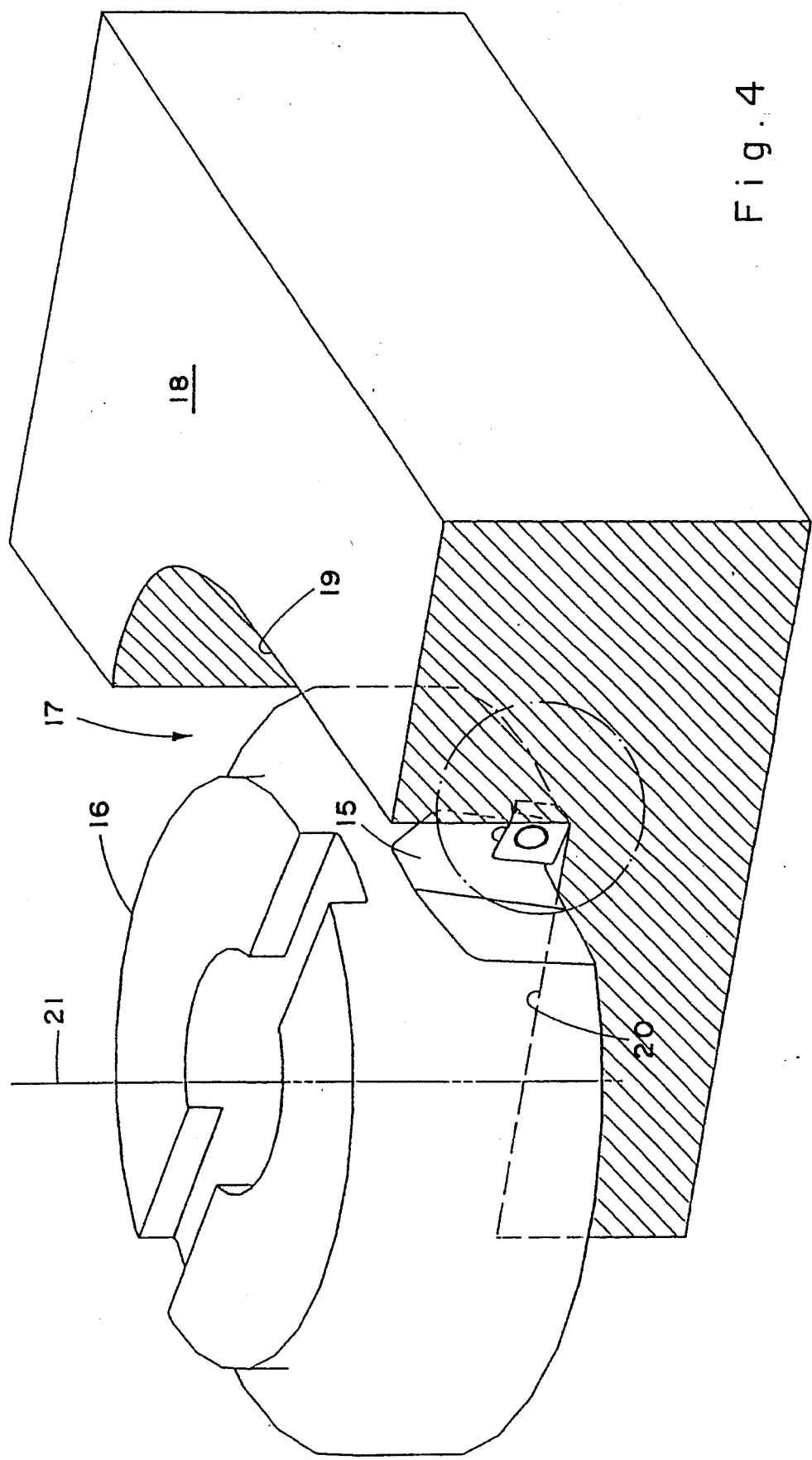
FIG. 4 is a schematic perspective view of a milling cutter tool including a milling insert in accordance with the invention, shown during a milling operation.
Figure 5:
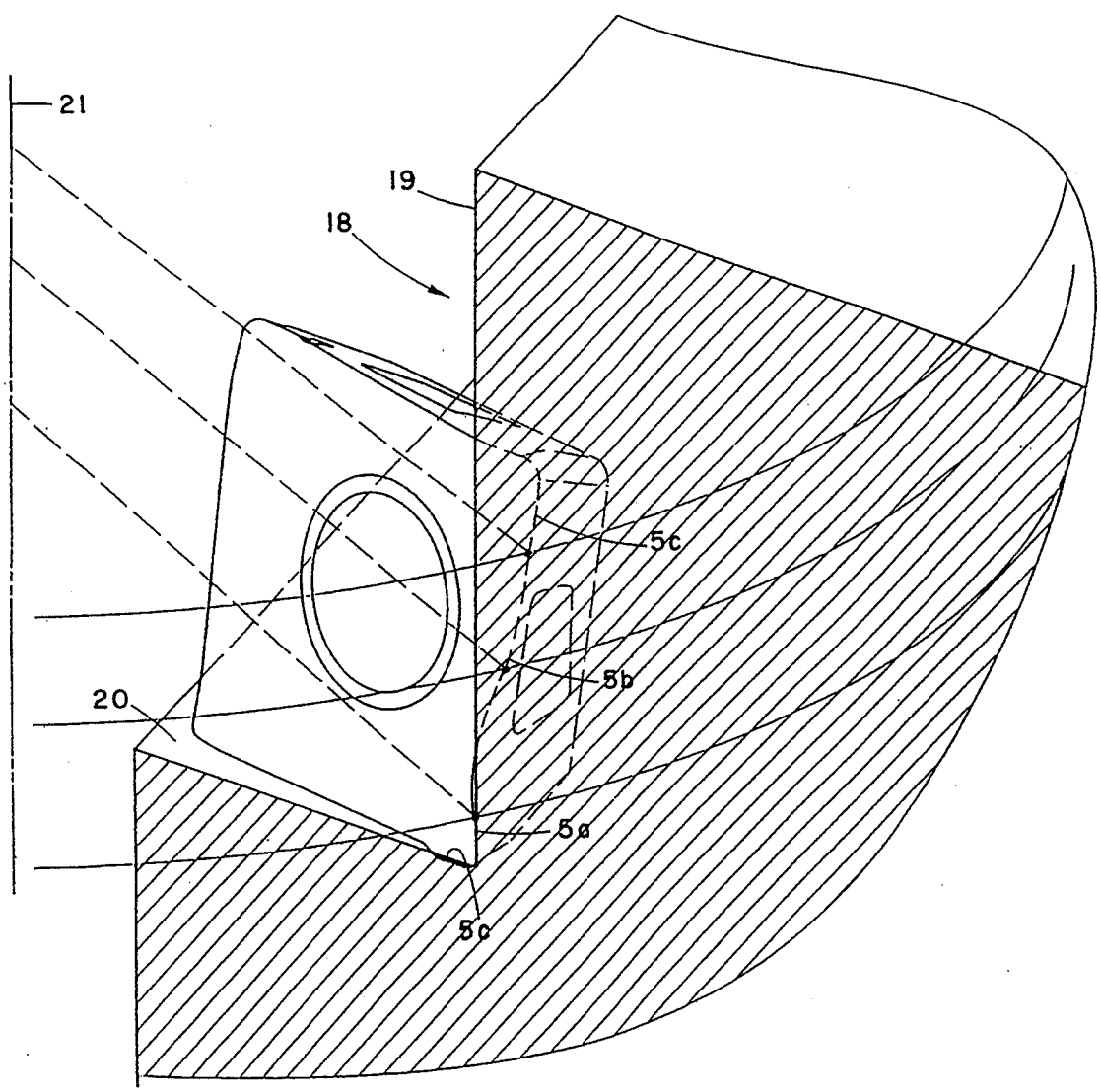
FIG. 5 is a view on an enlarged scale of a detail of the tool shown in FIG. 4.
Figure 6:
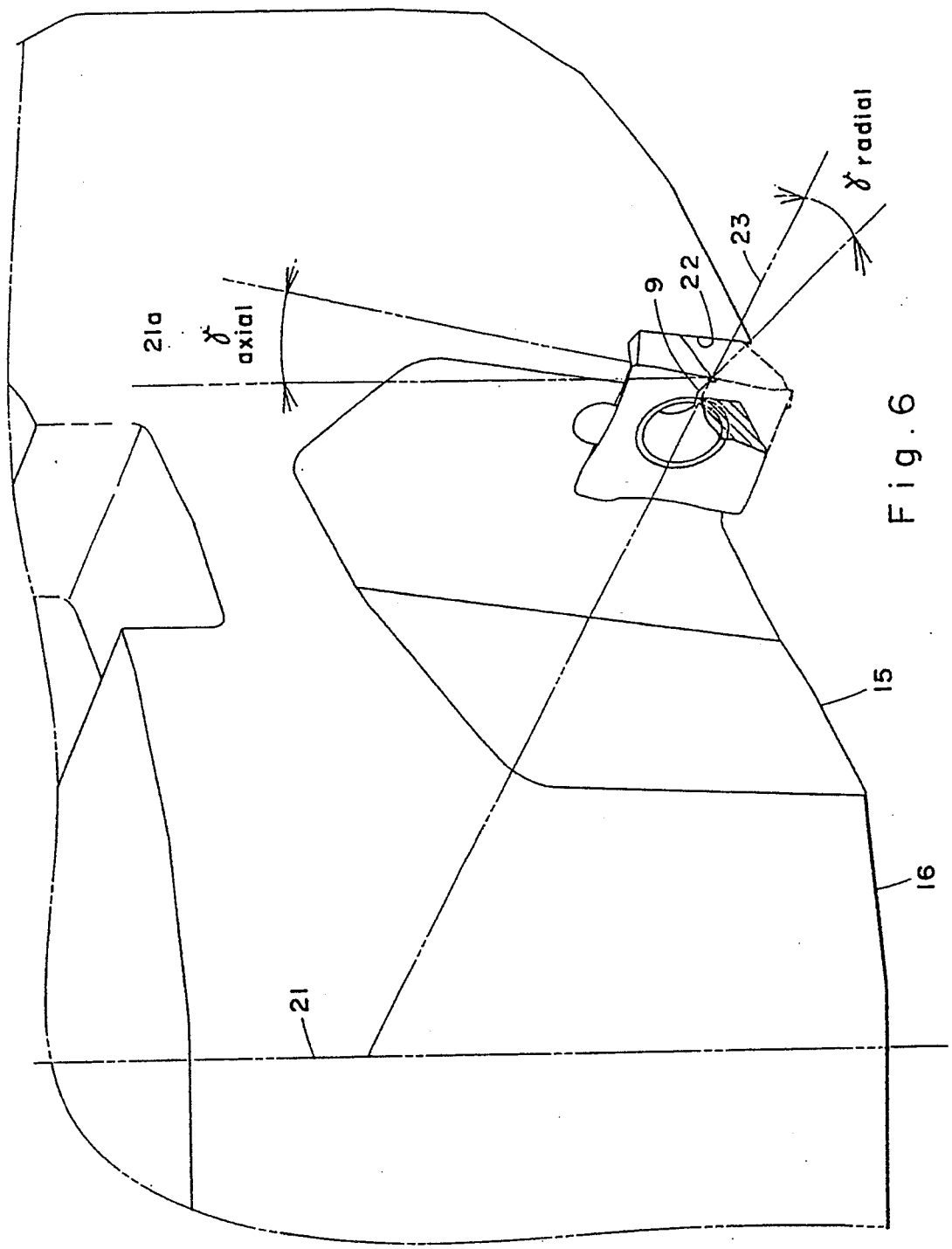
FIG. 6 is a schematic perspective view of the tool with the insert partially broken away so as to show clearly the angular disposition of the insert on the tool.

Reference will now be made to FIGS. 4, 5 and 6 of the drawings, which illustrate the mode of mounting of a milling cutting insert in accordance with the invention and as just described, in a milling cutter tool and the mode of operation of the milling cutter tool in milling a recess of the kind specified.

As seen in these figures, the milling cutting insert is mounted in a peripheral pocket 15 of a cylindrical cutting tool holder 16. The milling cutter tool is designed to mill a recess 17 in a workpiece 18 having an upright wall 19 and a base wall 20 which are disposed substantially at 90° with respect to each other, (i.e. a recess of the kind specified).

As seen in FIG. 5 of the drawings, the upright wall 19 of the recess 18 is milled by the: first and second cutting edge portions 5a, 5b of the cutting edge 5, whilst the third portion 5c of the transversely adjacent cutting edge 5 serves as a wiper for the base surface 20. In order to ensure that the upright surface 19 milled by the cutting edge portions 5a, 5b is a smooth surface without discontinuities, it is ensured that all points along the cutting edge portions 5a, 5b lie on the circumferential envelope generated by a director located at the radial distance from a rotary axis 21. Thus, it can be seen that the lines 22 passing through respective points on these cutting edge portions lie on this circumferential envelope.

Preferably, and in order to ensure that the third cutting edge portion 5c of the cutting edge effecting the milling does not become unduly worn during the milling operation, thereby impairing its function as a wiper when a subsequent cutting edge, is indexed into position (which would occur if the third cutting edge portion 5c were directed substantially parallel to the direction of the rotary axis 21) this third cutting edge portion 5c is subjected to a slight angular deviation from this parallel disposition and in this way does not come into contact with the upright wall being milled.

Reference will now be made to FIG. 6 of the drawings for a description of the angular mounting of the insert in the cutting tool holder.

As can be seen from the figure, the insert is mounted on a seating 22 which is substantially parallel to the rotary axis 21 of the tool 16. Since, however, the major second cutting edge portion 5b of the cutting edge 5 slopes downwardly towards the base, this cutting edge defines a positive axial angle $\gamma_a$ with respect to a reference line 21a parallel to the rotary axis 21 of the tool, and the insert can therefore be considered to be mounted axially positive in the tool.

On the other hand, in view of the provision of component chip rake surface 9 which slopes downwardly towards the base 1 of the insert from the cutting edge portion 5b, this component rake surface 9 defines a positive radial rake angle $\gamma_r$ with respect to a reference line 23 which extends from the rotary axis 21 normally thereto and through the cutting edge portion 5b. Thus, the insert and its mode of mounting is such that it can be considered to be mounted with a positive axial rake angle and with a positive radial rake angle.

As described above with reference to FIG. 1 of the drawings, the lower locating portion 4 of each side flank is formed with a central recessed section 7 bounded by outwardly curved sections 3b. As can be seen in FIG. 6 of the drawings, this construction of the locating portions of the insert ensures that the positioning of the insert on the seating of the tool holder is rendered very much more precise than would be the case where the locating portion constituted an uninterrupted planar surface. This is particularly achieved by virtue of the provision of the outwardly curved sections 3b, which ensure that the abutment of the insert against the seating walls takes place on very accurately defined locations of the insert.

As an alternative to the provision of smoothly, outwardly curved bounding sections 3b, the outwardly extending walls of these sections 3b may be formed of successive, narrowly-dimensioned planar portions which together constitute a convex, outwardly extending portion 3b.

Figure 3:
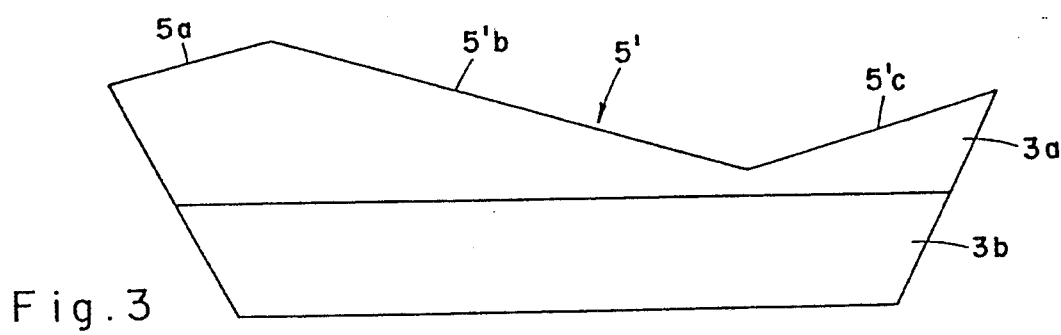
FIG. 3 is a schematic side elevation of a modified insert in accordance with the invention.

Whilst the invention has been specifically described with reference to a milling insert having its major cutting edge portion associated with continuously curved relief flank and cutting rake surfaces so as to ensure the maintenance of a substantially constant relief angle and radial rake angle along the length of this portion of the cutting edge when measured with respect to the tool, the invention is equally applicable where the major second portion of the cutting edge is substantially rectilinear with the relief angle of the relief flank surface in the region of a leading end of this major portion of the cutting edge substantially equalling the relief angle in the region of the trailing end, all when measured with respect to the tool. Such a modified insert is schematically shown in FIG. 3 of the drawings, wherein the cutting edge 5' is constituted by first, second and third cutting edge portions 5'a, 5'b, 5'c with the major cutting edge portion 5'b being substantially rectilinear in length. The upper relief flank portion 3a of the insert which is angularly disposed to the lower portion 3b and the component rake surface thereof is such that, when measured with respect to the tool, the relief flank angle of the relief flank surface in the region of the leading end of the insert substantially equals the relief flank angle in the region of the trailing end, all when measured with respect to the tool. This construction of the milling cutting insert in order to meet these requirements is fully described in our U.S. Pat. No. 5,078,550.

Milling cutting inserts in accordance with the invention and as just described by way of example can be very effectively used in milling recesses of the kind specified, whilst affording all the advantages inherent in square milling cutting inserts (i.e. a maximum number of indexable cutting edges) and at the same time the advantages inherent in milling cutting inserts constructed essentially in accordance with our prior U.S. Pat. Nos. 5,052.863, 5,071,292 and 5,078,550.

We claim:

1. An exchangeable milling insert for mounting in a cylindrical milling cutter tool and comprising a substantially square, planar base, a substantially square upper rake surface, side flanks extending outwardly from respective side edges of said base and intersecting said rake surface at respective cutting edges of said insert, each cutting edge comprising first, second and third successive portions wherein said first and third portions extend respectively from adjacent corners of said insert so as to merge with said second portion; said second portion constituting the major portion of the overall length of said cutting edge; said first portion sloping away from said base towards said second portion; said second portion sloping towards said base away from said first portion and towards said third portion and said third portion sloping away from said base away from said second portion and towards an adjacent corner of said insert; each side flank comprising upper and lower angularly disposed side surfaces of which the upper constitutes a relief flank surface and the lower constitutes a locating portion; at least the relief angle of said relief flank surface in the region of a leading end substantially equals the relief angle in the region of the trailing end, all when measured with respect to the tool; wherein during cutting, the first and second portions of a cutting edge cut an upright surface of a substantially 90° recess in a workpiece with a third portion of an adjacent cutting edge serving as a wiper for a base surface of the recess, at least the first and second portions of each cutting edge being so located that all points thereon lie on a cylindrical envelope generated by a line parallel to a rotary axis of the cutting tool and rotating with respect to the rotary axis at a radius equal to the cutting radius of the cutting tool.

2. An exchangeable milling insert according to claim 1, wherein said upper, relief flank surface, at least in the region thereof adjacent said second edge portion, is curved; said upper rake surface, at least in the region thereof adjacent each second edge portion of said cutting edge, being curved such that when the insert is mounted in the cutter tool, the relief angle and the radial rake angle when measured with respect to the tool remain substantially constant along the length of said second portion.

3. An exchangeable cutting insert according to claim 1, wherein said third portion is directed substantially parallel to said rotary axis so that substantially all points thereon are located on said cylindrical envelope.

4. An exchangeable cutting insert according to claim 1, wherein said third portion is angularly deviated with respect to said rotary axis so that points thereon are spaced from said cylindrical envelope.

5. An exchangeable cutting insert according to claim 1, wherein said locating portion is formed with a central recessed region bounded by a pair of relatively projecting sections adapted to bear on seating walls of a tool holder.

6. An exchangeable cutting insert according to claim 5, wherein said projecting sections are outwardly curved.

7. A milling cutter tool incorporating an exchangeable cutting insert according to claim 1, wherein said insert is mounted thereon so that the third portion of one cutting edge transversely adjacent an adjacent cutting edge serves as a wiper for said adjacent cutting edge.

8. A milling cutter tool according to claim 7, wherein a radial rake angle of the second portion of said one cutting edge is positive with respect to the tool.

* * * * *